July 12, 1938.  W. S. CALCOTT  2,123,766
PROCESS OF PREPARING ALUMINUM CHLORIDE
Filed Dec. 4, 1936
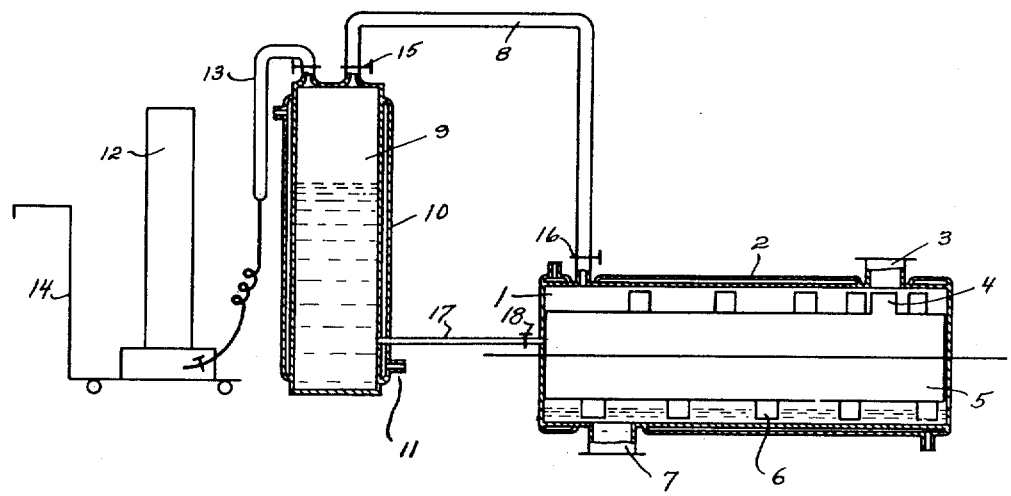
INVENTOR.
William S. Calcott
BY
Lynn B. Morris
ATTORNEY Patented July 12, 1938

2,123,766

UNITED STATES PATENT OFFICE 2,123,766

PROCESS OF PREPARING ALUMINUM CHLORIDE

William Stansfield Calcott, Woodstown, N. J., assignor to E. I. du Pont de Nemours & Company, Wilmington, Del., a corporation of Delaware Application December 4, 1936, Serial No. 114,288

8 Claims. (Cl. 23—93)

This invention relates to the manufacture of anhydrous aluminum chloride, more particularly it relates to the preparation of aluminum chloride from metallic aluminum and liquid chlorine, still more particularly it relates to the preparation of aluminum chloride from metallic aluminum and liquid chlorine at low temperatures under self-regulating conditions.

Heretofore, aluminum chloride has been manufactured in several different ways, the most important of which are: (1) by causing chlorine gas to react with metallic aluminum at high temperatures; (2) by bringing about an interaction between bauxite or alumina, carbon, and chlorine gas; and (3) by reacting aluminum with liquid chlorine after the manner set forth in Gibbs, U. S. Patent 1,422,560.

The first of these old processes possesses the disadvantages that the temperatures required are very high, and the excessive action of the chemicals upon the apparatus requires frequent and expensive replacements. The aluminum chloride distils out of the apparatus and is condensed, thus rendering the process a rather difficult and troublesome operation.

The second of the above mentioned old processes presents many of the same disadvantages enumerated above, in that excessive corrosive action of the reagents necessitates frequent and expensive replacements.

The third mentioned process as disclosed is attended by several disadvantages, chief among which is the difficulty and the expense of maintaining sufficient cooling to prevent a violent and uncontrollable reaction between the aluminum and excess of chlorine. One pound of aluminum in combining with chlorine gives off 11,150 B. t. u. which renders cooling of the apparatus a difficult problem.

It is an object of this invention to provide an improved method for the production of aluminum chloride. A further object is the production of aluminum chloride from metallic aluminum and liquid chlorine under conditions whereby violent and uncontrollable reactions do not occur. A still further object is the production of aluminum chloride from metallic aluminum and liquid chlorine under automatic self-regulating conditions. Other objects will appear hereinafter.

These objects are accomplished by reacting metallic aluminum with liquid chlorine while maintaining a substantially constant partial pressure of chlorine in the reaction zone. More specifically, they are accomplished by reacting metallic aluminum with liquid chlorine and supplying chlorine to the reaction zone at a rate sufficient to maintain a substantially constant partial pressure of chlorine in the reaction zone. Still more particularly, the objects are accomplished by charging metallic aluminum into a vessel which can be closed gas-tight and which communicates from its upper part with the upper part of another vessel that contains liquid chlorine. Both vessels are provided with jackets which may be maintained at constant temperatures. The communication between the two vessels is established in such a way that chlorine vapors may flow freely between the two vessels.

The object of automatic control of the reaction is achieved by maintaining a temperature differential between the jackets of the two vessels in such a way that the temperature of the jacket enclosing the chlorine storage vessel is higher than the jacket temperature of the reactor. This will cause the chlorine, which is used in an excess, to distil from the chlorine storage vessel to the reactor where the conversion of the aluminum to the aluminum chloride takes place. As soon as the heat liberated in the reaction raises the temperature in the reactor to, or slightly above the constant temperature at which the chlorine storage tank is maintained, the chlorine will start to distil back from the reactor to the chlorine storage tank and the reaction zone is cooled thereby. As soon as enough chlorine has distilled away so that the aluminum is not in contact with liquid chlorine any more, the reaction stops because metallic aluminum does not react with chlorine vapors at the temperatures employed in this process. It is apparent that the temperature and consequently the pressure of the entire system can at no time surpass the safe temperature and pressure corresponding to the constant temperature maintained in the jacket of the chlorine storage vessel.

As soon as the reaction has stopped, the cooling applied to the reactor will lower the temperature there and chlorine will again distil from the storage vessel to the reactor, condense, and react with the aluminum. This distillation between the two vessels will continue until all the aluminum in the reactor is converted to aluminum chloride. At this time an excess of liquid chlorine will be in the reactor.

To explain the above procedure more clearly, an apparatus arrangement which may be employed in carrying out this process is shown in the accompanying drawing. The drawing is somewhat diagrammatical and many structural variations may be made in the same without departing from the spirit of the invention.

In the drawing, similar reference characters refer to similar parts throughout the several views.

The figure is a schematic view of one type of apparatus suitable for carrying out the process of the present invention.

Referring in detail to the construction illustrated in the figure, the apparatus comprises a reaction vessel 1 which is a totally enclosed cylindrical chamber surrounded on its periphery with a jacket 2. The vessel is provided with a charging inlet 3 which communicates with a charging inlet 4 in rotating basket 5, which basket is provided with agitator blades 6. The vessel 1 is also provided with a discharge outlet 7 and a pipe or conduit 8 which establishes communication between the vessel 1 and chlorine storage vessel 9. The chlorine storage vessel is surrounded with a jacket 10 having openings 11 for a heat exchanging liquid. By circulating a heat exchanging fluid through the jacket, the chlorine in the storage tank may be maintained at a constant temperature. The chlorine storage vessel may be charged with liquid chlorine from chlorine cylinder 12 through pipe 13, which pipe may be provided with shut-off valves. The amount of chlorine charged into the chlorine storage vessel may be ascertain by a reading of the scales 14. The pipe or conduit 8 may be provided with valves 15 and 16 for shutting off the flow of vapors. The rotating basket 5 may be of any suitable foraminous construction such as a wire mesh or a perforated metal screen. Fresh aluminum surfaces are continuously exposed to the action of the liquid chlorine. A restricted conduit 17 provided with valve regulating means 18 may also be interposed if desired between the chlorine storage vessel and the reaction vessel. Thus, small amounts of liquid chlorine which will not unbalance the system nor affect its automatic action may be continuously or intermittently supplied to the system. The conduit should enter the reacion vessel at a point some distance above the bottom of the reaction vessel, so that it does not become clogged up with aluminum chloride.

The invention may be further illustrated but is not limited by the following example in which the quantities are stated in parts by weight.

*Example*

Two and one-tenth (2.1) parts of metallic aluminum are placed into the rotating basket 5, illustrated in the accompanying drawing. The horizontal autoclave in which this basket rotates is closed gas-tight, cooled by freely flowing brine (—5° C.) through the surrounding jacket 2, and evacuated to about 25 mm. of mercury to remove air. It is then connected with the chlorine storage vessel by means of the vapor line shown. The chlorine storage vessel was previously charged with 80 parts of liquid chlorine and the jacket surrounding the vessel was brought to a temperature of 40° C., at which temperature it is maintained throughout the duration of the reaction. This temperature corresponds to a pressure of 160 pounds per square inch. As soon as the connection is established between the two vessels, the chlorine starts to distil from the chlorine storage tank to the reactor and the pressure of the chlorine momentarily falls. The pressure then increases slowly as equilibrium is established and finally maintains itself at about 160 pounds per square inch corresponding to the pressure of chlorine at the temperature of the jacket of the chlorine storage tank. The partial pressure of chlorine in the reaction chamber remains substantially constant.

At this temperature chlorine continues to distil back and forth between the two vessels causing slight fluctuations in pressure, but the partial pressure of chlorine is substantially constant. This distillation continues as long as unreacted aluminum is present. The pressure fluctuation ceases when the conversion of the aluminum to aluminum chloride is finished and the pressure becomes constant at a pressure corresponding to the temperature of the cooling medium surrounding the reactor. The aluminum chloride is discharged shortly after the chlorine pressure fluctuations cease.

The excess of chlorine is distilled back to the chlorine storage tank to be used in the next charge by raising the temperature in the reaction chamber jacket and cooling the chlorine vessel jacket. All traces of chlorine are removed by heating the reaction vessel under a slight vacuum for a short time. The finished aluminum chloride is discharged through the discharge opening provided for this purpose.

Ten and thirty-seven hundredths (10.37) parts of anhydrous aluminum chloride which has a heat rise of 580 cal. (which indicates that the product is of a very high purity) are obtained, equal to a yield of 100% of theory based on the aluminum charged.

It is to be understood, of course, that the temperatures, pressures and conditions as set forth in the preceding example are merely illustrative. A number of variations will be readily apparent to those skilled in the art. Thus, a number of variations are possible without changing the spirit of the invention.

The temperature limits employed are only governed by the temperature at which the metal of the reactor is attacked (about 80° C. if iron is used) or by the temperature at which aluminum does not react with liquid chlorine. Temperatures of —33° C. have proved to be successful. I prefer to operate between —10° C. and +50° C. The following arrangement of the apparatus, for instance, also falls fully within the scope of my invention and is especially suitable to reduce the amount of cooling that has to be applied externally to the reactor. The reactor and chlorine storage tank are not placed on one plane, but the latter is placed above the reactor. The two vessels are connected by the vapor line described before and in addition by a restricted line that allows a relatively small amount of liquid chlorine to flow from the chlorine storage tank to the reactor. Additional cooling is thus effected. The cooling medium to be used on the reactor may be brine, water, liquid chlorine, etc. The cooling surface may be increased by the use of plates and coils in the chlorine storage or in separate equipment in the vapor line. Water, brine, etc., may be used in the chlorine vessel jacket.

Other types of reactors may be used, such as rotating drums, graining kettles, etc. The aluminum may be agitated by any suitable means. Manufacturing units may be set up in direct connection with chemical processes where regularly large amounts of $AlCl_3$ are used, thus making storing and handling of the finished product unnecessary.

This invention represents a decided improvement over the prior art. The reaction cannot get out of control, regardless of the amount of cooling that can be supplied to the reaction vessel in the preferred embodiment, so long as the temperature in the chlorine storage tank jacket is kept constant. A further advantage is that very little supervision is necessary to carry out the process and practically no manual control of the reaction is necessary. A still further advantage resides in the fact that the danger of a serious explosion is minimized to a very great extent. Further advantages are that equipment corrosion is reduced to a large degree and the production of anhydrous aluminum chloride from metallic aluminum and liquid chlorine becomes practical.

While I have disclosed the preferred embodiments of my invention, it will be readily apparent to those skilled in the art that many variations and modifications may be made therein without departing from the spirit of the invention. Accordingly, the scope of the invention is to be limited solely by the appended claims construed as broadly as is permissible in view of the prior art.

I claim:

1. The process of preparing anhydrous aluminum chloride which comprises reacting metallic aluminum with a body of liquid chlorine, maintaining a source of chlorine in constant communication with said body, said source being a second body of liquid chlorine maintained at a higher and a constant temperature, communication between said bodies being established by a flow of chlorine vapors.

2. The process which comprises effecting a reaction between liquid chlorine and aluminum in a closed reaction vessel, the vapor space of the reaction vessel communicating with the vapor space of a second vessel containing a body of chlorine which is maintained at a constant temperature.

3. The process which comprises reacting aluminum with a body of liquid chlorine, maintaining a source of chlorine supply in constant communication with said body, vaporizing chlorine from a source of liquid chlorine at a constant temperature and establishing vapor communication between said body and said source.

4. The process which comprises effecting a reaction between liquid chlorine and aluminum in a reaction zone, the vapor space of the reaction zone communicating with the vapor space of a source of liquid chlorine, the temperatures in the reaction zone and body of chlorine being maintained substantially constant, the temperature in the last-mentioned being higher than that of the reaction zone.

5. The process which comprises reacting aluminum with a body of liquid chlorine which is maintained in heat-conducting relationship with a heat-exchanging medium maintained at a substantially constant temperature, and maintaining a source of chlorine supply in constant communication with said body by vaporizing liquid chlorine with a heat-exchanging medium maintained at a substantially constant temperature, which temperature is higher than that of the first-mentioned heat-exchanging medium.

6. The process of claim 5 in which fresh aluminum surfaces are continuously contacted with the liquid chlorine.

7. The process which comprises reacting metallic aluminum with liquid chlorine in a reaction zone, continuously replenishing the liquid chlorine by supplying chlorine vapors from a source of liquid chlorine maintained at a temperature higher than that of the reaction zone and establishing a free flow of chlorine vapors between the reaction zone and the source of chlorine.

8. The process of claim 7, in which an additional restricted flow of liquid chlorine is established between the source of liquid chlorine and the reaction zone.

WILLIAM S. CALCOTT.

---

CERTIFICATE OF CORRECTION.

Patent No. 2,123,766. July 12, 1938.

WILLIAM STANSFIELD CALCOTT.

It is hereby certified that error appears in the printed specification of the above numbered patent requiring correction as follows: Page 3, second column, line 13, claim 4, strike out the words "in the last-mentioned" and insert instead of the source of chlorine; and that the said Letters Patent should be read with this correction therein that the same may conform to the record of the case in the Patent Office.

Signed and sealed this 30th day of August, A. D. 1938.

Henry Van Arsdale (Seal)

Acting Commissioner of Patents.

get out of control, regardless of the amount of cooling that can be supplied to the reaction vessel in the preferred embodiment, so long as the temperature in the chlorine storage tank jacket is kept constant. A further advantage is that very little supervision is necessary to carry out the process and practically no manual control of the reaction is necessary. A still further advantage resides in the fact that the danger of a serious explosion is minimized to a very great extent. Further advantages are that equipment corrosion is reduced to a large degree and the production of anhydrous aluminum chloride from metallic aluminum and liquid chlorine becomes practical.

While I have disclosed the preferred embodiments of my invention, it will be readily apparent to those skilled in the art that many variations and modifications may be made therein without departing from the spirit of the invention. Accordingly, the scope of the invention is to be limited solely by the appended claims construed as broadly as is permissible in view of the prior art.

I claim:

1. The process of preparing anhydrous aluminum chloride which comprises reacting metallic aluminum with a body of liquid chlorine, maintaining a source of chlorine in constant communication with said body, said source being a second body of liquid chlorine maintained at a higher and a constant temperature, communication between said bodies being established by a flow of chlorine vapors.

2. The process which comprises effecting a reaction between liquid chlorine and aluminum in a closed reaction vessel, the vapor space of the reaction vessel communicating with the vapor space of a second vessel containing a body of chlorine which is maintained at a constant temperature.

3. The process which comprises reacting aluminum with a body of liquid chlorine, maintaining a source of chlorine supply in constant communication with said body, vaporizing chlorine from a source of liquid chlorine at a constant temperature and establishing vapor communication between said body and said source.

4. The process which comprises effecting a reaction between liquid chlorine and aluminum in a reaction zone, the vapor space of the reaction zone communicating with the vapor space of a source of liquid chlorine, the temperatures in the reaction zone and body of chlorine being maintained substantially constant, the temperature in the last-mentioned being higher than that of the reaction zone.

5. The process which comprises reacting aluminum with a body of liquid chlorine which is maintained in heat-conducting relationship with a heat-exchanging medium maintained at a substantially constant temperature, and maintaining a source of chlorine supply in constant communication with said body by vaporizing liquid chlorine with a heat-exchanging medium maintained at a substantially constant temperature, which temperature is higher than that of the first-mentioned heat-exchanging medium.

6. The process of claim 5 in which fresh aluminum surfaces are continuously contacted with the liquid chlorine.

7. The process which comprises reacting metallic aluminum with liquid chlorine in a reaction zone, continuously replenishing the liquid chlorine by supplying chlorine vapors from a source of liquid chlorine maintained at a temperature higher than that of the reaction zone and establishing a free flow of chlorine vapors between the reaction zone and the source of chlorine.

8. The process of claim 7, in which an additional restricted flow of liquid chlorine is established between the source of liquid chlorine and the reaction zone.

WILLIAM S. CALCOTT.

---

CERTIFICATE OF CORRECTION.

Patent No. 2,123,766. July 12, 1938.

WILLIAM STANSFIELD CALCOTT.

It is hereby certified that error appears in the printed specification of the above numbered patent requiring correction as follows: Page 3, second column, line 13, claim 4, strike out the words "in the last-mentioned" and insert instead of the source of chlorine; and that the said Letters Patent should be read with this correction therein that the same may conform to the record of the case in the Patent Office.

Signed and sealed this 30th day of August, A. D. 1938.

Henry Van Arsdale (Seal) Acting Commissioner of Patents.

CERTIFICATE OF CORRECTION.

Patent No. 2,123,766.            July 12, 1938.

WILLIAM STANSFIELD CALCOTT.

It is hereby certified that error appears in the printed specification of the above numbered patent requiring correction as follows: Page 3, second column, line 13, claim 4, strike out the words "in the last-mentioned" and insert instead of the source of chlorine; and that the said Letters Patent should be read with this correction therein that the same may conform to the record of the case in the Patent Office.

Signed and sealed this 30th day of August, A. D. 1938.

Henry Van Arsdale (Seal)                    Acting Commissioner of Patents.